US008805005B2

(12) United States Patent
Jahangir et al.

(10) Patent No.: US 8,805,005 B2
(45) Date of Patent: Aug. 12, 2014

(54) SYSTEM AND METHOD FOR PROCESSING RADAR IMAGERY

(75) Inventors: Mohammed Jahangir, Birmingham (GB); Paul Graham Kealey, Salisbury (GB); Christopher Paul Moate, Malvern (GB); Robert David Hill, Malvern (GB)

(73) Assignee: Qinetiq Limited, Hampshire (GB)

( * ) Notice: Subject to any disclaimer, the term of this patent is extended or adjusted under 35 U.S.C. 154(b) by 438 days.

(21) Appl. No.: 13/139,882

(22) PCT Filed: Nov. 4, 2009

(86) PCT No.: PCT/GB2009/002619
§ 371 (c)(1),
(2), (4) Date: Jul. 25, 2011

(87) PCT Pub. No.: WO2010/070261
PCT Pub. Date: Jun. 24, 2010

(65) Prior Publication Data
US 2011/0299733 A1 Dec. 8, 2011

Related U.S. Application Data

(60) Provisional application No. 61/174,187, filed on Apr. 30, 2009.

(30) Foreign Application Priority Data

Dec. 18, 2008 (GB) .................................. 0823034.4

(51) Int. Cl.
*G06K 9/00* (2006.01)
*H04N 5/225* (2006.01)
*G01S 13/08* (2006.01)
*G01S 13/58* (2006.01)
*G01S 13/00* (2006.01)

(52) U.S. Cl.
USPC ........... 382/103; 348/169; 342/104; 342/115; 342/147

(58) Field of Classification Search
None
See application file for complete search history.

(56) References Cited

U.S. PATENT DOCUMENTS

| 5,563,601 | A | 10/1996 | Cataldo |
| 5,818,383 | A | 10/1998 | Stockburger et al. |
| 2003/0206129 | A1 | 11/2003 | Obenshain |

FOREIGN PATENT DOCUMENTS

| EP | 0 686 943 A2 | 12/1995 |
| WO | WO 2007/113469 A1 | 10/2007 |

OTHER PUBLICATIONS

International Search Report issued in International Patent Application No. PCT/GB2009/002619 dated Feb. 26, 2010.

(Continued)

*Primary Examiner* — Randolph I Chu
(74) *Attorney, Agent, or Firm* — Oliff PLC

(57) ABSTRACT

The present invention relates to a system and method for processing imagery, such as may be derived from a coherent imaging system e.g. a synthetic aperture radar (SAR). The system processes sequences of SAR images of a region taken in at least two different passes and generates Coherent Change Detection (CCD) base images from corresponding images of each pass. A reference image is formed from one or more of the CCD base images images, and an incoherent change detection image formed by comparison between a given CCD base image and the reference image. The technique is able to detect targets from tracks left in soft ground, or from shadow areas caused by vehicles, and so does not rely on a reflection directly from the target itself. The technique may be implemented on data recorded in real time, or may be done in post-processing on a suitable computer system.

19 Claims, 8 Drawing Sheets

(56) References Cited

OTHER PUBLICATIONS

Written Opinion issued in International Patent Application No. PCT/GB2009/002619 dated Feb. 26, 2010.

Search Report issued in British Application No. GB0823034.4 dated Mar. 30, 2009.

Corr et al., "Coherent change detection of vehicle movements," *Proc. IGARSS*, 1998, pp. 2451-2453, vol. 5.

Jahangir, "Moving target detection for synthetic aperture radar via shadow detection," *IET Radar Conference*, Oct. 2007.

Zebker, "Studying the earth with interferometric radar," *IEEE Computing in Science and Engineering*, 2000, pp. 52-60, vol. 2, No. 3. Stanford University.

Yang et al., "Adaptive along-track multi-channel SAR interferometry for moving target detection and tracking," *IEEE Int. Radar Conference*, May 2005, pp. 337-342.

Scarborough et al., "SAR Change Detection MTI," *Proc. SPIE Algorithms for Synthetic Aperture Radar Imagery XIII*, 2006, vol. 6237.

Minardi et al., "Ground moving target detection and tracking based on generalized SAR processing and change detection," *Proc. SPIE Algorithms for Synthetic Aperture Radar Imagery XII*, 2005, pp. 156-165, vol. 5808.

Jahangir et al., "PodSAR: a versatile real-time SAR GMTI surveillance and targeting system," *IEEE Radar Conference*, May 2008.

Jahangir et al., "Extracting information from shadows in SAR imagery," *Inter. Conf. on Machine Vision*, 2007, pp. 107-112.

Jahangir et al., "Utilising signal absence in SAR imagery for moving target detection," *IET Forum on Waveform Density and Design in Communications*, Nov. 22, 2006, pp. 41-46.

Dickey et al., "Recovering shape from shadows in synthetic aperture radar imagery," *Proc. SPIE Radar Sensor Technology XII*, 2008, vol. 6947.

$S_1$ $C_1$

Front of vehicle trail $C_7$

Extend of new movement (trail growth) observed in the
incoherent image formed from $C_1$ and $C_7$

| 1 | 1 | 0 | 0 |
|---|---|---|---|
| 0 | 1 | 0 | 0 |
| 0 | 0 | 1 | 1 |

Figure 7

SYSTEM AND METHOD FOR PROCESSING RADAR IMAGERY

This invention relates to a method of and a system for processing synthetic aperture imagery, such as synthetic aperture radar imagery, from two or more independent imaging passes of the same scene. More specifically, it relates to the detection of moving targets in coherent change detection radar imagery by observation of physical changes in the ground surface produced by such moving targets and also changes in the imagery resulting from the shadows of the moving targets Synthetic Aperture Radar (SAR) systems are known. SAR as an imaging technique has been developed to obtain high resolution radar imagery of surface features. It uses a technique of coherently integrating samples collected from a moving platform over a period of time and using the results to create an antenna having a large synthetic aperture to obtain very high azimuth compression of the sampled data. For best results these samples have to be all aligned in phase for a SAR image to be properly focused in azimuth. For example, in order to obtain a focused image of the static ground from a sideways looking SAR this is simply a quadratic phase correction across a nominally straight-line synthetic aperture.

A pair of SAR images collected for the same scene at different time instances can then be compared against each other to locate any changes in the scene that have occurred in the interval between collections. There are broadly two classes of Change Detection that can be performed with SAR imagery, Incoherent Change Detection (ICD) and Coherent Change Detection (CCD).

ICD merely identifies the changes in the mean backscatter power of the scene. Typically, the average image intensity ratio of the image pair is computed to detect such changes. ICD can be applied to many different imagery types, including Electro Optical (EO) and Infra Red (IR) as well as radar images, and is useful in detecting visible changes in the image.

CCD on the other hand, identifies changes in both the amplitude and phase content between image pairs. It relies upon the imaging processes being coherent and requires the SAR images as complex data i.e. where each pixel has a real and imaginary value. Specifically, CCD will not work with modulus of the SAR images or equivalent since the phase information is lost in the image transformation process. The phase change between a pair of images can be computed using their sample coherence. As the phase change is measured in fractions of the radar wavelength (for example the wavelength at 10 GHz is 3 cm), CCD has the potential to detect very subtle scene changes that may remain undetected using incoherent techniques.

CCD has been shown to be effective against detecting vehicle movements as reported in reference [1]. Even minor disturbance in the scattering surface caused by the movement of the vehicle over the surface can result in complete loss of the coherence. Provided the surrounding area in the scene maintains coherence there will be adequate contrast between the vehicle disturbance and the background to detect the vehicle trail in the CCD image. The overall scene coherence may be affected by other temporal disturbances such as wind and rain which will then limit the ability for detecting the man-made disturbances.

CCD is also able to reveal phase changes resulting from the masking of the background clutter return due to obscuration from an object present in the scene, i.e. a shadow region. In such circumstances no clutter signal will be recorded from the shadow region and hence the pixel value will be merely the thermal noise value produced by the receiver. This means that the clutter intensity value is substituted for a low value determined by the thermal noise floor and the clutter phase value is replaced by a random phase. It is this latter alteration that then results in a loss of coherence that can be observed in the CCD image. Thus the shadow of the object will create a localised loss of coherence. Provided that the region surrounding the shadow has high coherence then the shadow footprint in the CCD image becomes observable. Once the target object moves on, a region previously in shadow will be illuminated once more, and, for surfaces having high coherence, radar returns from that region will be similar in both amplitude and phase to their values before it was in shadow. Thus the shadow region, and hence the target, may be identified by this temporary loss of coherence.

A CCD image is created from a pair of SAR images of a scene, each measured independently from each other. Each pixel represents the coherence statistics of the corresponding pair of pixels in the original images. A CCD image will tend to show vehicle trails (i.e. the path taken by the wheels of a vehicle) as continuous high-contrast lines. The CCD image will also tend to show regions that are masked by a target shadow as high-intensity regions. The outline of these bright regions will broadly follow the outline of the target shadow footprint. The CCD image is only able to show the cumulative history of movement that has taken place in the interval between collections for ground trail and the instantaneous position of the target based on the shadow CCD changes. There is no means of directly computing the velocity of the target from a single CCD image. Furthermore, from the cumulative ground trail there is no means of providing an accurate time reference for the position of the target or confirming that it is still present in the scene from the single CCD image.

Where the motion parameters for a moving target can be estimated such as with target shadows in the original SAR images as described in reference [2], such information can be utilised in recovering the actual image of the target. Typically, the blurred and defocused image of a moving target will be recovered through an exhaustive search over all possible target motion parameters until an optimally focused image is obtained. Any estimates of the target motion parameters can be used to seed this process and substantially reduce the dimensionality of the search. As the single CCD image provides no such means for calculating the target motion parameters it is unable to assist with the process of recovering the image of the moving target.

Furthermore, detection based upon a single CCD image can result in considerable false alarms due to disturbances that are unrelated to vehicle movements for example, earth disturbance, rearrangements of objects in the scene and temporal disturbance due to wind and other environmental factors. Also where there are several tracks that criss-cross each other then it can present a considerable challenge in identifying individual vehicle tracks. Hence the ability to detect vehicle trails and shadows robustly with minimum false alarms in the presence of considerable ground activity can be very problematic with a single CCD image.

If a sequence of CCD images is generated from the same scene then it provides a means for pin-pointing dynamic changes in the scene more precisely. In order to be able to realistically observe the dynamic changes from a moving ground target the temporal offset between successive CCD images needs to be of an order of a few seconds at the most.

For CCD to operate successfully it is important that the pair of SAR images that are collected have near identical imaging geometry so that there is overall good coherence between the images. Multiple SAR images therefore need to be all acquired at the same imaging geometry in order to produce a sequence of CCD images. Typically, a single phase centre SAR platform will only be able to collect a single image at a specified geometry in any one pass. Therefore, multiple images would necessitate entirely separate imaging passes by the platform which will result in a time lag of minutes possibly hours between successive imaging passes. Whilst such CCD sequence have been utilised in tracking slow dynamics such as those due to geological disturbances as described in reference [3] they are inadequate for tracking rapid changes such as those from a moving target.

A set of platforms flying in a convoy formation each collecting a SAR image from the same viewing geometry could considerably shorten the time lag between successive collects. However, the offset can not be reduced beyond a certain lower limit owing to the minimum separation that would have to be maintained for the safe operations of multiple platforms. Furthermore, there are considerable implications in terms of cost and logistic complications in operating multiple platforms.

Antenna systems with multiple phase centres in the along-track direction allow for the possibility of performing multiple collects in a single pass with very short temporal duration between each image. However, realistically only a finite number of phase centres are possible due to constraints on the antenna size. This, in turn, severely limits the overall length of the image sequence that can be achieved with such system. Moreover, multi-phase centre systems come at a considerable increased cost. Along track interferometric or Space Time Adaptive Processing (STAP) such as those described by references [4] and [5] are established technique for detecting moving targets using a finite number of phase centres. These techniques essentially operate by processing the direct Doppler return from the moving targets and are similar in technique to conventional Ground Moving Target Indication (GMTI) with the advantage of being able to achieve lower Minimum Detection Velocity (MDV) and comparatively improved azimuth location accuracy.

A practical way of achieving a CCD image sequence using a single phase centre SAR system is to perform wide angle spotlight imaging. Each pass generates multiple images at the maximum system resolution for the same scene at varying aspect angles. An initial pass generates the primary image sequence. A repeat pass generates a second set of images. CCD images are formed by pairing each image in the repeat pass sequence with the corresponding image in the primary pass that is at the same imaging geometry which in this case implies identical aspect angles. Thus a full complement of CCD image sequence is generated from just two individual imaging passes and the relative temporal offset between consecutive CCD images can be of the order of a few seconds. This makes the update rate in the CCD sequence sufficiently short to observe the rapid dynamics that would be typical of a ground moving target.

Reference [6] mentions the phenomena of generating a CCD sequence using multi-aspect image sequence from just two repeat passes. The authors propose using the target direct echo for observing the phase change in the CCD sequence. They degrade the azimuth resolution to minimise the target defocusing and estimate the target motion parameters by tracking its return over multiple CCD images. However, since target returns are displaced in cross-range due to any along-range velocity, such a technique can be subject to significant positional errors in cross range. Furthermore, it is reliant on being able to obtain an appreciable return from the target. In some instances the target echo may be so small or the extent of defocusing is such that it signature is lost in the speckle noise and therefore undetected in the CCD sequence.

According to a first aspect of the present invention there is provided a method of detecting movement parameters of a ground based target by processing first and a second temporal sequences of returns from a Synthetic Aperture system, each sequence collected during separate imaging passes, the returns comprising a plurality of synthetic aperture base images of a region characterised in that it comprises the steps of:

i) pairing an image in the second temporal sequence with a corresponding primary image from the first temporal sequence, aligning the images if required and forming a coherent change detection (CCD) image, and repeating for each pair to produce a plurality of CCD base images;

ii) forming a reference image from one or more of the CCD base images;

iii) forming an "incoherent change detection" image by normalising the reference image with a suitably aligned, predetermined CCD base image from the sequence.

Hence a CCD sequence is generated from two passes of a wide angle synthetic aperture imaging system. The synthetic aperture system may be a SAR system. The first pass provides a set of primary images. The second pass provides a second set of images which when paired with appropriate images from the primary sequence generates a CCD sequence with a very short temporal offset between each CCD image. Note that an appropriate image will be, for a given image taken in the first pass, the image in the second pass that most closely matches the viewpoint of the given first pass image. A vehicle moving in the scene at the time of the second pass will result in a visible change in the CCD image at the location of the vehicle. Over the CCD sequence the vehicle trail will grow in the image. This trail from the moving vehicle can then be detected and tracked over the CCD sequence to detect, locate and estimate the full set of translation motion parameters for the moving target. Likewise, a vehicle moving in the scene at the time of the first pass will result in a visible change in the CCD image at the location of the vehicle. Over the CCD sequence the vehicle trail will recede in the image. This trail from the moving vehicle can then be detected and tracked over the CCD sequence to detect, locate and estimate the full set of translation motion parameters for the moving target.

A moving vehicle or other object will generally have a shadow associated therewith, the shadow being a region on the ground that is not illuminated by the synthetic aperture imaging system due to the region being masked by the vehicle. This shadow will produce a visible change in the CCD image over the region where the clutter is being masked by the object's shadow. In the region of the shadow the clutter signal is replaced by essentially random thermal noise that will not correlate with the original clutter phase from that region. If the clutter region bordering the shadow region is in perfect coherence then the entire shadow outline will become visible as a bright region against a dark background. As the target moves, new regions of the clutter will get masked and lose coherence whereas previously masked regions that become visible to the radar will revert to the original clutter signal values and thus appear once again as coherent in the CCD image and thus blend in with the rest of the clutter background. This evaluation of the shadow dependent CCD changes can then be detected and tracked over the CCD sequence to detect, locate and estimate the full set of translation motion parameters for the moving target. The detection process is identical irrespective of whether the target is moving during the first or the second pass.

The processing of the CCD sequence is akin to performing incoherent change detection processing on the CCD image. This procedure has parallels with the shadow detection process described in reference [7] for detecting moving targets through tracking shadow movements in a sequence of single pass multi-look spotlight SAR image sequence. In the case of the shadows the change detection process is detecting changes in mean backscatter due to the displacement from shadows of a moving target in a sequence of SAR images. In the present invention the change detection process detects changes in the mean coherence level from a vehicle trail formed on the ground over a sequence of CCD images or from the shadow of the target creating a localised phase change in the background clutter response over the sequence of CCD images.

Thus the change detection procedure applied to the CCD sequence involves a similar process to that described in reference [7] that involves using a series of base images to generate reference images through temporal averaging of one or more base images. Each base image is suitably aligned prior to forming the reference image. The reference image are normalised with a given base image from the sequence that is suitably aligned with the reference image to form an 'incoherent change detection' image.

It will be appreciated that the present invention relates to a new approach that exploits the information in a sequence of CCD images to aid in the detection and location of moving targets. Instead of using the target's direct echo response in the CCD sequence it exploits the CCD response from the disturbance to the ground surface from the vehicle movement or the phase change in the background clutter signal due to target shadow. It provides for a method to observe the CCD response due to a target in real-time and may detect and locate a moving target to a good degree of accuracy. The target motion parameter thus estimated can be used to re-process the original complex SAR data to recover a focused image of the actual target itself.

Preferably, the incoherent change detection image is passed to a threshold detector that highlights those parts of the incoherent change detection image that are above a given threshold value to produce an output image.

Advantageously, a plurality of incoherent change detection images, or, if a threshold detector is used, output images (produced as described below), are produced, each being associated with a particular CCD base image. The reference image used in producing each incoherent change detection image is preferably updated for each normalisation step performed.

Preferably, each incoherent change detection or output image is processed using a pre-screening procedure. The pre-screening may comprise a Constant False Alarm Rate (CFAR) algorithm. The pre-screening procedure may also comprise clustering or discrimination procedures.

Advantageously a temporal tracking algorithm may be performed on the outputs of the pre-screening procedure, or on a sequence of incoherent change detection or output images.

Once the target motion parameters have been estimated corrective processing can be performed on the original SAR complex data to obtain a properly focused and correctly geolocated image of the moving target. This process may be repeated for each target detected in the scene. It may be also advantageous to attempt to focus the shadow of the target since shadow distortions are only a function of linear motion components where as target echo are also affected by accelerations and higher motion components that are likely to have larger error estimates associated with them. The shadows of the target obtained at multiple aspect angles then can be used in constructing the outline of the target shape as performed in reference [8].

An important application of this invention is the extraction of target motion parameters by performing change detection on vehicle ground trail in a CCD image sequence or the phase change in the background clutter signal resulting from target shadow. The benefit of both of these phenomena will be discussed separately.

For the detections using the vehicle ground trail the method does not use the direct echo from the target at any stage of the processing. Therefore, the detection performance is entirely independent of the target RCS, the height of the target and loosely dependent on aspects of the shape of the target, e.g. the wheel width and separation on an axle. It is simply dependent on the target's ability to cause a disturbance to the ground surface as it travels over the surface. The target's radial Minimum Detectable Velocity (MDV) is essentially zero and the target can be detected travelling in any direction. A single imaging mode (as defined below) will be able to detect and maintain track on a target that is repeatedly stopping and starting. This can be contrasted with a more conventional approach where GMTI radar mode is used for detecting faster targets and those that are stationary or travelling below the MDV are detected using the SAR mode. Such swapping between SAR and GMTI modes can lead to down time and loss in coverage. As the method is detecting the targets using an image based approach it has good potential for high location accuracy both in range and cross-range. False alarms may be reduced since the change detection process applied to the CCD sequence will only track changes that are sustained over multiple images. The process does rely upon the ability to generate the CCD sequence with a temporal offset between adjacent CCD images that is comparable to the timescales of the vehicle movements. For example, beneficially the timescale for acquisition of a sequence of SAR base images, either in a first or a second pass of a region will be such that a moving vehicle has time to move an appreciable amount during the pass, and the time between individual images in a sequence is such that, over the full sequence, the different positions of the vehicle can be observed. Also it is dependent on the ground echo to have sufficient speckle component such that surface disturbance can be observed in the CCD image. Also the technique relies on adequate contrast between the man-made disturbance and other sources of temporal decorrelations, such as wind disturbance etc.

For the detections that utilise the target shadow dependent changes in coherence in the CCD image again the technique does not use the direct echo from the target at any stage of the processing. Therefore, the detection performance is entirely independent of the target RCS. However, since the size of the target shadow footprint is related to the target dimensions particularly its height and the grazing angle at which the sensor is imaging the object the detection performance will be related to the size of the object. The target's radial Minimum Detectable Velocity (MDV) is essentially still zero in this case and the target can be detected travelling in any direction. A single imaging mode (as defined in the previous paragraph) will be able to detect and maintain track on a target that is repeatedly stopping and starting. The location accuracy remains high both in range and cross-range. False alarms can be substantially reduced since the change detection process applied to the CCD sequence will only track changes that are sustained over multiple images. The process does rely upon the ability to generate the CCD sequence with a temporal offset between adjacent CCD images that is comparable to the timescales of the vehicle movements. Unlike the vehicle ground trail the shadow changes do not require the ground to be physically disturbed. Instead the requirement is that the region in which the shadow is cast is able (when not in shadow) to provide a sufficiently coherent reflection back to the synthetic aperture measurement system so that when the clutter signal is masked by the target shadow a sufficient phase change is registered in the CCD image. Thus this means that a target moving along a hard surface that will not form a CCD ground trail but the shadow that is projected along the side of the road, resulting in a shadow CCD change, will enable the target to be detected with this approach whilst a ground trail only method will fail to detect it. The shadow based technique does still rely on adequate contrast between the man-made disturbance and other sources of temporal decorrelations.

This invention unlike the approach adopted in reference [6] does offer complete independence from the targets own radar signature. For the approach that uses the target ground trail the approach is also independent of the targets shadow footprint. Hence for the case of detection via the ground trail a flat wooden cart of the same width as a high-sided armoured vehicle may potentially have the same detection performance. This technique benefits from the full CCD resolution in range and cross-range whereas there are much lower cross-range resolutions achieved with the approach in reference [6]. Also this method provides for a simpler technique based on a single stage 'incoherent change detection process' for extracting the target motion parameters whereas reference [6] has to establish the required degradation in the SAR resolution that would be necessary, locate the target in range and determine the cross-range displacement errors before correctly relocating the target at its correct location.

According to a second aspect of the present invention there is provided a processing system for the detection of movement parameters of a target, the processing system processing returns from a Synthetic Aperture system, comprising a processor adapted to receive data from the synthetic aperture system, the data comprising image information from two independent imaging passes of the same scene, the image information comprising a plurality of synthetic aperture images from each pass of the scene, the processing system comprising a processor adapted to process the data in the form of synthetic aperture images from the two independent imaging passes and, pairing primary and repeat pass images for the same geometries, to produce a coherent change detection (CCD) image for each pairing, so generating a plurality of CCD base images;
characterised in that:
the processor is adapted to form a reference image from one or more of the CCD base images, the one or more CCD base images being suitably spatially aligned with respect to each other; and
the processor is further adapted to normalise the reference image with a given CCD base image to form an associated incoherent change detection image, the given CCD base image being suitably aligned with the reference image.

The system may be integrated with a synthetic aperture system such as a SAR system, or it may alternatively be implemented as a separate computer system arranged to process synthetic aperture image data. The data from the synthetic aperture system may comprise "live" data, in which case the processor is preferably adapted to run in real time. Alternatively, the data from the synthetic aperture system may be stored in a memory, such as on a hard disk, with the processor taking data from the hard disk at a later time. In this case the processor need not be adapted to run in real time.

According to a third aspect of the present invention there is provided a computer program adapted to implement the method of the first aspect of the present invention on a computer system, and further adapted, when run on the computer system, to produce image data comprising an incoherent change detection image. The computer program may be arranged to run on a computer system, the computer system comprising memory and a processor. The computer program may comprise instructions that cause the processor to interact with the memory according to the method of the first aspect to produce the image data, and to store the image data in memory.

The computer program may be implemented on a dedicated computer system connected to a synthetic aperture system such as a SAR, or it may be implemented on a separate computer system.

In order that the invention might be more fully understood, embodiments thereof will now be described, by way of example only, with reference to the accompanying drawings, in which:

FIG. 7 illustrates a binary sub-image for a hypothetical cluster.

Figure 1:
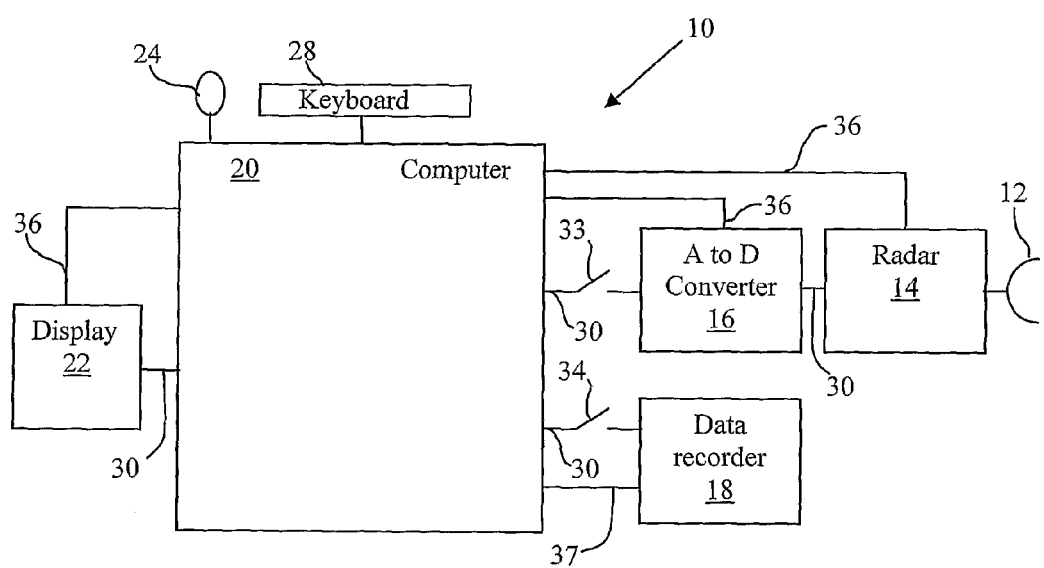
FIG. 1 is a schematic block diagram of a known synthetic aperture radar data gathering system capable of producing data suitable for the current invention.
Figure 2:
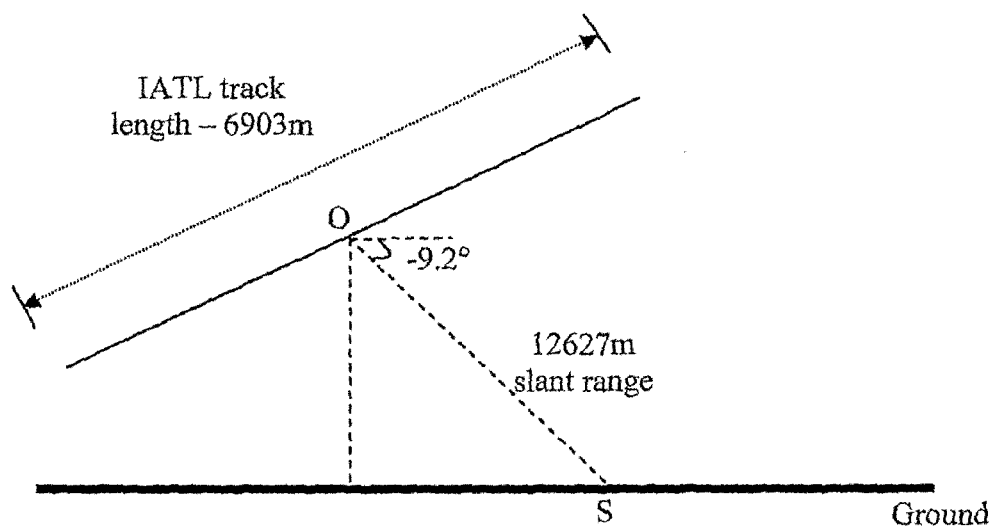
FIG. 2 illustrates the SAR imaging geometry configuration deployed by the system of FIG. 1 when collecting data.
Figure 3:
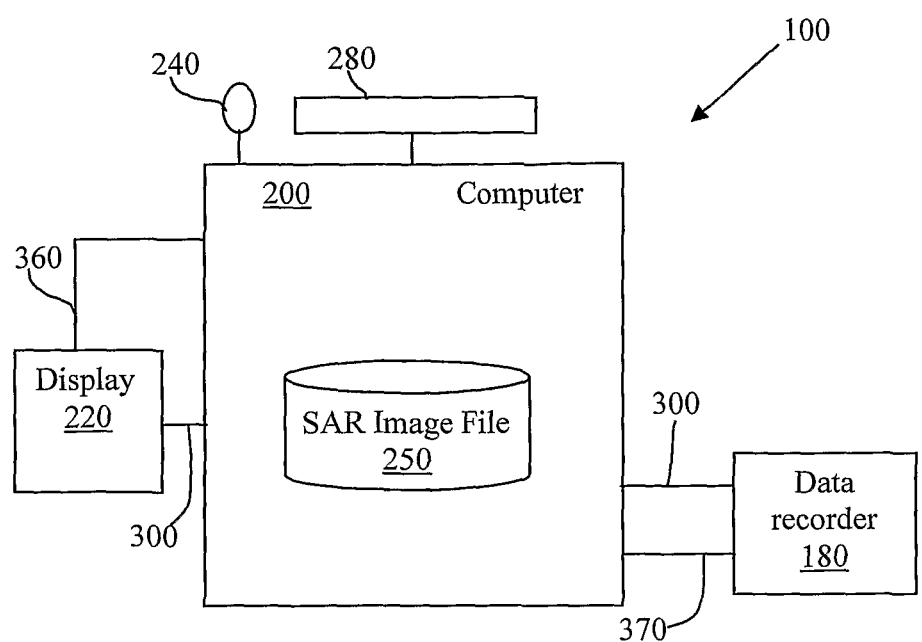
FIG. 3 is a schematic block diagram of the SAR image formation system of the invention.

Referring to FIGS. 1, 2 and 3 there is shown a radar target detection system suitable for collecting data for use by the invention, and also for implementation of the invention. It is indicated generally by a data acquisition system 10, a SAR image formation system 100 and a CCD image formation system 300 respectively. Each of the sub-systems 10, 100 and 300 are explained hence forth.

The system 10 referred to in FIG. 1 is the Integrated Airborne Targeting Laboratory (IATL) radar system operating from an Andover aircraft. The system 10 is used in the collection of raw radar data, prior to processing according to the present invention. It comprises an antenna 12 mounted within a pod that suspends from underneath the aircraft fuselage, a radar 14, an analogue-to-digital (A to D) converter 16, a data recorder 18, a computer 20 and a display device 22. The computer 20 is under operator control via a mouse 24 and a keyboard 28. Data passes between parts of the system 10 along data lines 30, of which those between the computer and A-to-D converter 16 and the computer 20 and data recorder 18, include respective switches 33 and 34. Control lines 36 provide for computer-generated control signals to pass to the radar device 14, the A-to-D converter 16 and the display device 22. A communication line 37 is provided for passing messages between the computer 20 and data recorder 18.

The antenna 12 is a high gain antenna. The radar 14 is a coherent pulse radar. It uses the same antenna for transmitting and receiving and is therefore a monostatic system. It operates at a centre frequency of 9.46 GHz and at this frequency the antenna has a beam width of 1.26° degrees in azimuth and 7.95° in elevation. The radar has a peak transmit power of 3500 W and is able to operate at ranges from 10-100 km. It is capable of operating at a maximum bandwidth of 1.44 GHz. In collecting the data used in an example embodiment described herein the operating bandwidth was set to 1.44 GHz the maximum supported by the system. The radar is linearly polarised with both transmit and receive polarisations set to horizontal. It operates by transmitting a series of pulses at a Pulse Repetition Frequency (PRF) of 1000 Hz. Full details of the IATL system can be found in Reference [9].

After each pulse has been transmitted, the radar is quiescent for a short duration and then records 11279 values corresponding to radar echo from a series of 11279 concurrent range cells. The range cells are arranged along a radial line extending outwardly from the antenna centre. The first range cell is the nearest in range to the antenna and the last the furthest in range. The radar uses the time delay between the end of transmission of a pulse and the start of the recording of the first range cell to determine the slant range offset to the start of the first range cell.

The antenna can pan −15 degrees to +15 degrees in azimuth and from +5 degrees to −45 degrees in elevation. For the collection of data used by the invention as described herein the elevation angle is set to −9.2 degrees. A fixed Point Of Interest (POI) on the ground is specified and the radar automatically adjusts the antenna azimuth aim point to continually point directly at the POI. Each of the 11279 values that the radar records for each pulse that is transmitted is a complex value with a real and imaginary part. The analogue signal is passed through an A-to-D converter where the signal is digitised. All subsequent processing is performed on the digital data. The radar transmits 1000 pulses per second and receives data for 11279 range cells for each pulse.

The A-to-D converter 16 is of a standard type and is capable of digitising both real and imaginary parts of a complex input signal. The data recorder 18 is a standard high-speed tape recorder, for example a Quantum LTO-3 tape recorder with 800 GB of capacity on a single cartridge and backup speeds of 324 GB/hr. The computer 20 is an Opteron computer with four 2.4 GHz AMD Opteron processors. The system 10 has a graphical user interface (GUI) which is displayed on the display device 22 and with which an operator may interact with the system 10 using the mouse 24 and the keyboard 28. Results generated by the system 10 are also displayed on the display device 22. There are two separate GUI displays; a radar data monitor that reports the progress of the platform on a map together with a range of house keeping parametric information and an image viewer where processed imagery can be presented to the operator. The image viewer GUI has a number of additional user functionality such as map overlays and tools for navigating around the image and manipulating multiple images.

Referring to FIG. 2, for the data collection the IATL flies a track 6903 m standing-off at a range that gives a slant range of 12627 m from the centre of the IATL track (Point O) to the chosen POI on the ground (Point S). The track altitude is chosen to give a grazing angle of −9.2° from track centre Point O to the POI S. The IATL is flown in a straight line along the track at a constant speed of 83 m/s. The antenna 12 azimuth is trained on the POI S. As the IATL platform progresses along the track the azimuth angle of the antenna 12 is automatically steered by the radar to keep the antenna aim point continuously pointing at the POI. This form of data acquisition is termed spotlight mode imaging.

At the start of the imaging run IATL aligns along the designated imaging track. The antenna 12 is pointed at the POI S. The initial azimuth squint angle of the antenna 12 is about +15 degrees. The radar device 14 is automatically switched on by the computer 20 when IATL reaches the designated point along the track for start of imaging. The switch 33 is closed and raw radar data is recorded onto the memory storage in computer 20. The IATL platform flies along the designated 6903 m long track at a nominal speed of 83 m/s. As the IATL platform progresses along the track the antenna 12 azimuth angle is continually adjusted by control signal from the computer 20. As the IATL platform travels through the Point O the antenna 12 squint angle falls to 0 degrees. After this point the antenna 12 has negative squint angles. By the time the IATL reaches the end of the 6903 m long track the antenna 12 azimuth angle has squinted to a value of about −15 degrees. The switch 33 is opened and the radar 14 is shut down. The operator enters a command using the keyboard 28 for the computer 20 to close the switch 34 and store a copy of the data from the computer 20 memory on to the recorder device media. When the data backup is completed the switch 34 is opened. The operator makes a note of the file names of the data stored on the recorder device 18 that has been automatically generated by the computer 20. This completes the data acquisition step for system 10.

Shown in FIG. 3 is a SAR image formation system 100, used to produce base images for later processing according to the present invention. It comprises a data recorder 180, a computer 200 and a display device 220. The computer 200 is under operator control via a mouse 240 and a keyboard 280. Data passes between parts of the system 100 along data lines 300. Control lines 360 provide for computer-generated control signals to pass to the display device 220. A communication line 370 is provided for passing messages between the computer 200 and data recorder 180. The data recorder 180, the computer 200 and its peripherals 220 to 370 are identical to the devices numbered 18 through to 37 in FIG. 1.

In use, an operator uses keyboard 280 to set up parameters required by the system, including the latitude, longitude and altitude of a region of interest, the aircraft bearing angle, grazing angle, slant range offset along with required starting and ending azimuth squint angle of antenna 12 and number of squint angle steps. The squint angle is the off-boresight angle. Zero degree squint is the angle pointing in the direction of platform broadside. Positive squint is pointing toward the nose of the platform and negative squint along the tail. Thus for example the squint angle for pointing in the direction of the platform nose is +90 degrees. The operator then finally specifies the range and azimuth (cross-range) resolution and the pixel spacing for the SAR images. The operator also specifies the size of the image in meters both in range and azimuth. The computer 200 then using standard spotlight SAR processing algorithms with automated focusing procedures forms a series of SAR base image files 250, one for each requested squint angle, from the raw radar pulse data. For the data used in embodiments described herein, each SAR image is of the size 3002 azimuth pixels by 8002 range pixels with the pixel spacing being 0.1 m in both azimuth and range. The algorithms for forming spotlight SAR base images at squinted geometry from raw radar pulses are known. References [11] and [12] are just two examples from among several open literature references describing the method for producing spotlight SAR images at arbitrary squint angles from raw radar data from a moving platform.

For this example the system 100 is deployed to produce SAR base images from two independent imaging passes against the same POI that were flown approximately 22 minutes apart. Data from each of the two passes is processed to form SAR base images from squint angle δ degrees to 12 degrees. The description below shows the processing of 7 SAR base image files 250 produced during each pass. For each pass, each SAR base image is taken from a viewpoint separated spatially by approximately 230 m from the last, and separated temporally by around 2.8 seconds. Thus between each image being recorded there is time for an appreciable amount of movement for ground vehicles moving at normal speeds, and thus time for significant "tracks" to be created.

The SAR base image files from the primary (first) pass will be referred to hence forth as $P_1, P_2, \ldots, P_7$. $P_1$ is the label for the SAR base image file at squint angle 12 degrees, $P_2$ is the label for the SAR base image file at squint angle 11 degrees and so on. Using this labelling rule $P_7$ is the label for the SAR base image file at squint angle 6 degrees.

The base images from the second pass will be referred to as $S_1, S_2, \ldots, S_7$ where the subscript x in $S_x$ corresponds to the identical squint angle as the subscript for the primary images $P_x$. Thus for example $P_1$ and $S_1$ are two SAR images from the primary and repeat pass respectively each formed at identical squint angles which for this embodiment is 12 degrees.

Each of the SAR base image files 250 from both the primary and repeat pass is a 2-dimensional matrix that has 8002 rows with each row containing 3002 columns. Each row represents radar data received from a specified range position and each column represents data from specified azimuth position. Therefore, for example element (100, 12) will be the radar data derived from the 100th range cell at the 12th azimuth cell. The full 2-dimensional matrix is thus a SAR image that is 8002 range cell pixels by 3002 azimuth cell pixels in size. Each element or pixel in the 2-dimensional matrix is a complex number with a real and imaginary component. The pixel value represents the complex Radar Cross Section (RCS) for the corresponding location on the ground as measured by the radar. For this embodiment the range and azimuth pixel spacing is 0.1 m. Each pixel therefore corresponds to a 0.1 m by 0.1 m radar footprint on the ground. The entire SAR base image file 250 corresponds to a radar footprint that is 800.2 m long in range and 300.2 m wide in azimuth. The corresponding resolution of the image in range and azimuth is 0.13 m. This ratio between spatial sampling and true image resolution ensures optimum visualisation of the data. SAR base image files 250 are stored on the computer 200. The data files 250 are stored as binary files with an ASCII header that contains information on the pixel spacing and the SAR image squint angle. Thus for file $P_1$ the header will state a squint angle of 12 degrees. The generation of the SAR image data files $P_1$ to $P_7$ and $S_1$ to $S_7$ completes the SAR image formation process for system 100.

Figure 4:
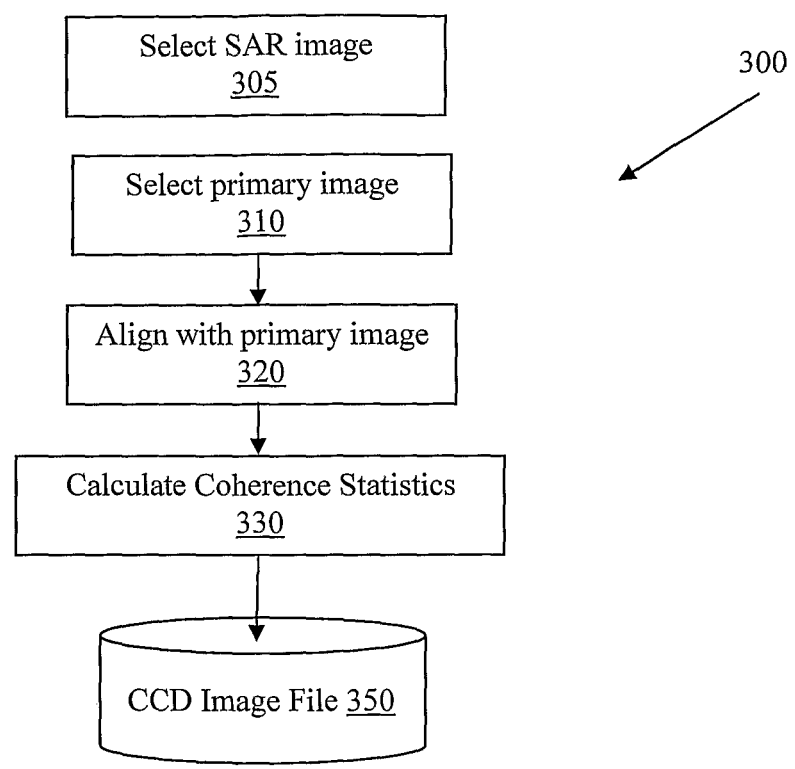
FIG. 4 is a schematic block diagram of the CCD image formation system of the invention.

FIG. 4 shows the steps involved in a first embodiment of the present invention. It shows a flow diagram illustrating the steps of routine 305 to 330 executed by the computer 200 to process the SAR image files 250 to produce the CCD base line images 350 by the process 300. The series comprise an image selection routine 305, a pairing with primary base image routine 310, an image alignment routine 320 and finally a coherence statistics calculation routine 330. The output of the process 300 is a CCD base image 350.

The process 300 operates by first undertaking the action of routine 305 that selects one of the images, $S_i$, where $i=1, \ldots, 7$, from among the second pass base line images. Routine 310 then selects the appropriate corresponding image from the primary base images. In this case it is the primary base image $P_j$ such that $j=i$. Thus if 305 selects the image $S_1$ then the routine 310 will select the image $P_1$. The operations of 305 and 310 can be performed manually where a human selects the appropriate files or the process can be automated as a script that can pair the images based on the squint angle information contained in the header of the SAR files 250.

Routine 320 aligns the SAR image $S_i$ with $P_j$. The images $S_i$ and $P_j$ are correlated with each other which provide an estimate of the mis-alignment in both row and column. The image $S_i$ is then shifted in row and column by this amount to produce an aligned image $SS_i$. The correlation based image alignment technique is a well established procedure in image signal processing and reference [13] is just one of many references in the open literature on this topic. For this embodiment the image, alignment is performed to within 1/10 of a pixel which is achieved by expanding the original images each by a factor of 10 before calculating the correlation. The alignment is then applied to the expanded version of $S_i$ before shrinking it back by a factor of 10. The final image $SS_i$ would then be aligned to within a $10^{th}$ of a pixel to the image $P_j$. It may be advantages to perform the correlation calculation on small sub-sections of images centred on bright points that are present in both $S_i$ and $P_j$. Each of these sub-section correlations will produce a separate alignment offset estimate which can be averaged to produce a mean alignment off-set. The procedure for applying the shift correction to $S_i$ remains the same irrespective of whether the alignment offset has been derived using the whole image or as an average of multiple alignment estimates. A skilled person will be aware of yet other techniques for producing the align result as of routine 320.

Routine 330 then calculates the coherence statistics for $SS_i$ and $P_j$. This produces a CCD base image file 350. For this embodiment these files are labelled $C_i$, where i is the same value index as in $SS_i$ and therefore signifies the same squint angle as for $SS_i$. $C_i$ is same size as the file $SS_i$ and for that matter $P_j$. Each pixel in $C_i$ is the coherence statistics γ, the mean normalised product of $P_j$ with the complex conjugate of $SS_i$ given as [10]:

$$\gamma = |<I_1 I_2^*>|/\sqrt{(<|I_1|^2><|I_2|^2>)} \qquad (1)$$

where $I_1$ is the complex pixel value from $P_j$, $I_2^*$ is the complex conjugate value from $SS_i$, |.| denotes the absolute value, and <.> the ensemble mean value of a quantity that is estimated as $$\frac{1}{NM} \sum_{l=1}^{N} \sum_{k=1}^{M} x_{lk}$$

for a quantity x over a window that is N row long and M column wide. For this embodiment the window lengths used are M=N=10. This resulted in a reduction in the effective resolution of the CCD image by a factor of 10 i.e., 1 m from 0.1 m of the original SAR files 250. However, the averaging process does produce a less noisy estimate of the coherence statistics which helps with subsequence processing steps. The pixel spacing remains unchanged at 0.1 m and therefore the total image size of the CCD image $C_i$ is identical to the original SAR image.

A person skilled in the matter of CCD calculations can devise modified techniques for performing the process 330. One particular alternative is to generate multiple $SS_i$, each with a different alignment correction and produce different $C_i$ variants. The final $C_i$ output is then obtained by selecting the maximum at each pixel from among the group of $C_i$ images thus calculated.

Figure 6:
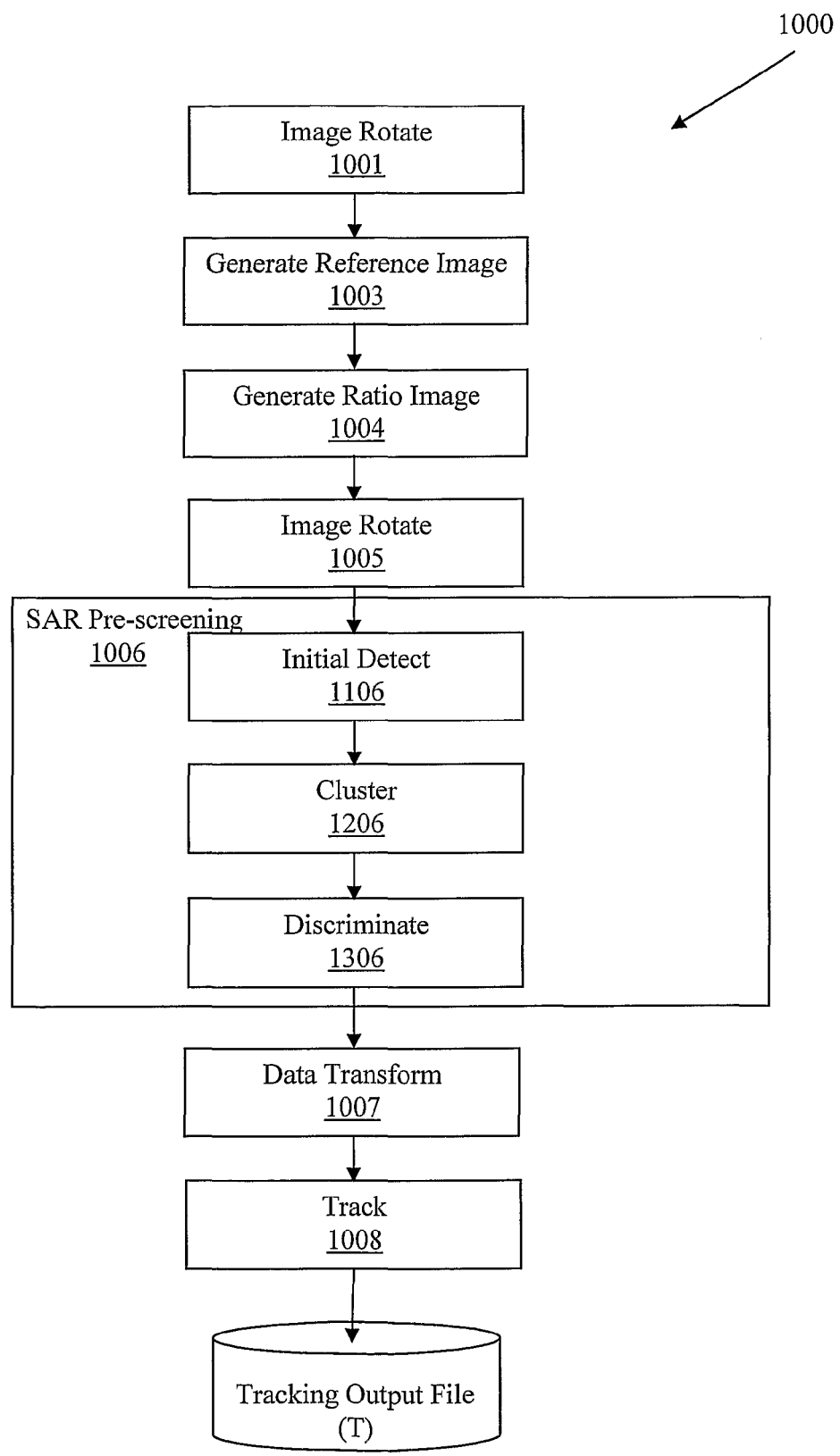
FIG. 6 is a flow diagram of the change detection system processing routines used in the system of FIG. 2.

A single iteration of the process 300 will produce one of the base CCD image 350 that have been labelled as $C_i$. The process is repeated six times to generate the CCD base images $C_1, \ldots, C_7$. This completes the process for the CCD base image generation of system 300. The advantages of generating the CCD base image sequence from just two passes and taking pairs of multi-aspect images at identical geometries is that the time lapse between each CCD image in the sequence is very short—of the order of a few seconds. This allows for rapid dynamics in the scene to be captured by a change detection process as conducted by method steps 1000 as illustrated in FIG. 6.

Figure 5A:
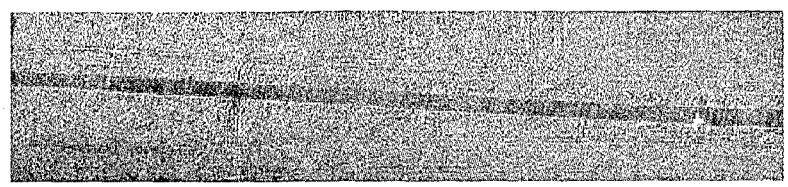
FIG. 5 shows, using real CCD imagery, example results of an embodiment of the system described in relation to FIG. 2 using a) vehicle ground trail changes, and b) shadow changes.
Figure 5A:
Figure 5A:
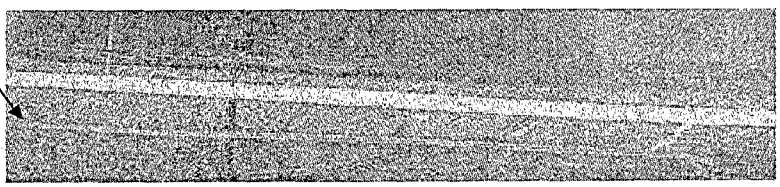
Figure 5A:
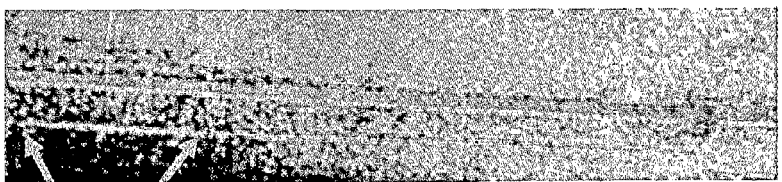

As a further illustration of this technique reference is made to FIG. 5*a* that shows one embodiment of this invention with the aid of a series of image frames that illustrate the evolution of the CCD image due to ground disturbance produced by the movement of a vehicle over a grass surface. In each case a small section of the image from the same region is shown. The top image is a SAR base image $S_1$. There is a vehicle travelling in the scene going from right to left just below the track (the dark horizontal line in the SAR image). Neither the moving vehicle nor any trace made in the grass can be seen from the SAR image alone. The second image from the top in FIG. 5*a* is the CCD base image $C_1$. Whilst the vehicle itself does not appear in the CCD image there is an unmistakable bright line appearing in the grass surface where the vehicle has moved along the ground. The arrow head points to the front of the vehicle trail in $C_1$. With reference to the third image from the top in FIG. 5*a* which is the CCD base image $C_7$ the front of the vehicle trail can be clearly seen to have progressed along the ground by a noticeable distance in the image. A change detection result between such CCD base line images will detect these differences in the length of the vehicle ground trail and hence detect, locate and estimate the velocity of the moving target without using any direct echo or shadow information from the target itself. As an illustration of such incoherent change detection applied to the CCD base images to detect vehicle trails the bottom image in FIG. 5*a* shows a ratio image of $C_1$ and $C_7$. Scene details that are present in both images appear as grey in this combined image. Bright scene features present only in $C_1$ appear dark and those present in $C_7$ only appear bright in the combined image. From this ratio image the vehicle trail appears grey except for the last section that appears bright white since this corresponds to new movement since the previous CCD base image, $C_1$, i.e. that movement taken place between image $C_1$ and $C_7$, the extent of which is approximately indicated by the arrows in the bottom image of FIG. 5*a*. Detecting the presence of such new changes through processing of the CCD base image sequence is an important aspect of this invention that enables the detection of such dynamic events such as the movement of ground vehicles along rough surfaces.

In this Figure there was no vehicle moving in the scene for the primary pass collection and the vehicle was moving during the second pass. Similar vehicle trail dynamics can be observed if the target was present and moving during the primary pass and no vehicle present in the scene for the second pass. In this case the vehicle trail instead of growing will retract in the CCD base images. However, the CCD base image sequence can only be generated once the second repeat pass imaging has been flown. Once the CCD base images have been generated any rapid dynamics can be still detected, but it will be appreciated that this detection can only take place once both imaging passes have been done, along with the subsequent CCD processing according to the present invention. The time period between carrying out the two imaging passes thus introduces a latency period, between the first imaging pass and being able to observe and detect a moving target. Therefore a real-time rapid response capability against moving targets will be limited by this latency period.

Of course in many scenes there will be vehicles moving in both the primary and the second passes of the synthetic aperture system, leading to a more complex environment wherein vehicle trail dynamics will be both growing and retracting in the CCD base images when seen in succession, e.g. in a video sequence. The various behaviours, such as a track receding or forming with time will show however when the movement took place (i.e. the first or second pass respectively).

Figure 5B:
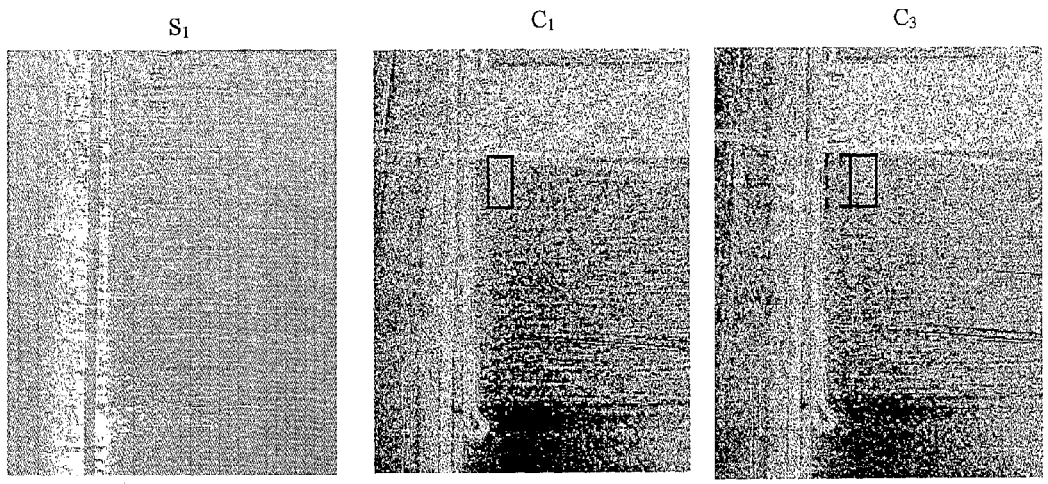

As a further illustration of this technique reference is made to FIG. 5B that shows one embodiment of this invention with the aid of a series of image frames that illustrate the evolution of the CCD image including target shadows produced by the movement of a vehicle. In each case a small section of the image from the same region is shown. The image on the right is a SAR base image $S_1$. There is a vehicle travelling in the scene to the left of the vertical track in the field. It is travelling at right angles to the track going left to right. The image of the vehicle is entirely invisible. The middle image in FIG. 5B is the CCD base image $C_1$. The vehicle happens to be moving in a part of the field that appears very bright in the CCD image. Although the vehicle is moving near the edge of this bright region its ground trail is not visible as it cannot be distinguish from other strong CCD changes showing up in the image at the same location. However, there is a rectangular bright region that appears against the darker part of the field (bounded by a black box for ease of illustration) this bright region comprising CCD changes due to the shadow of the target. Where a region in the SAR image is masked by the target shadow the clutter phase is substituted for random noise phase. In the CCD image this appears as a bright area, signifying loss of coherence. Hence the presence of the target shadow is marked by this shadow related CCD signal. Note here the shadow is observed via a change in phase, and more particularly in the background signal phase. In the SAR shadow detection method as in reference [7] the shadow is recognised in the image due to a change in the intensity values in the region masked by target shadow. With reference to the image on the right in FIG. 5B which is the CCD base image $C_3$ the target has moved further to the right in the image. The shadow of the target has also shifted to the right and the black box marks the new position of the CCD signal associated to the target shadow. Note the previous position of the shadow, as marked by the dashed black box, is now no longer bright. This is because the background has returned to the original clutter values, and with no phase change the CCD image measures this region to be coherent, and thus appearing black. A change detection result between such CCD base line images will now detect the shift in the shadow related CCD changes and hence detect, locate and estimate the velocity of the moving target without using any direct echo from the target itself. Detecting the presence of such new changes through processing of the CCD base image sequence is an important application of this invention that enables the detection of such dynamic events such as the evolution of the CCD changes due to the displacement of the shadow of the moving vehicle. As the shadow dependent CCD changes are not permanent, this means that the same patch of the image can be used for detecting separate targets. This differs from the technique that uses the ground trail as, in that approach, once a new trail is formed, the CCD change becomes permanent preventing changes from subsequent targets travelling along the same path being detected. Furthermore, as shadow changes are observed simply from blocking the clutter signal, the CCD changes can be observed even when the ground is not actually physically disturbed for example in the case of rigid surface. Hence by examining shadow dependent CCD changes targets can be detected travelling not just on soft ground but also on hard surfaces where the background is sufficiently strong to enable the differences in phase due to shadow masking to be observed as such in the CCD imagery. Unlike the ground trail CCD changes that show either an expanding or receding pattern dependent upon whether the target is moving in the primary or secondary pass the shadow CCD changes appear identical irrespective of in which pass the target was moving.

FIG. 6 shows a flow diagram illustrating the steps of routine 1001 to 1008 executed by the computer 200 to process the CCD base files 350 to perform the moving target ground trail detection process 1000. The outcome from these routines is displayed on the display device 220 using the data link 300. The series of steps comprise an image rotation routine 1001, a reference image generation routine 1003, an image ratio generation routine 1004, another image rotation routine 1005, a SAR pre-screening routine 1006, a data transformation routine 1007 and a tracking routine 1008.

The description below relates to processing that may be carried out on the CCD base images to provide an automatic target detection capability. The processing is similar to that done in co-pending PCT patent application, publication No. WO2007/113469, the contents, as they relate to the processing of change detection images, is hereby included by reference.

For each CCD base image file $C_i$, where i=1, ..., 7, the image rotation routine 1001 rotates the image by the squint angle where the squint angle is obtained from the file ASCII header. Following this rotation the image rows and columns are aligned along the platform across-track and along-track axis. Any given pixel in the transformed images now refers to the same location on the ground. All the images are now aligned with respect to the ground. For this embodiment $C_1$ is rotated by an angle 12 degrees, $C_2$ by an angle 11 degrees and so on. The output of the image rotation routine 1001 is a set of 7 rotated CCD base image files. These are labelled $B_1$ through to $B_7$.

The reference image generation routine 1003 produces a reference image corresponding to each CCD base image from routine 1001. For this embodiment the reference image for an image $B_i$ is simply the proceeding image in the sequence i.e.

$$B_i^{ref} = B_{i-1} \text{ where } i=2 \text{ to } 7 \quad (2)$$

Note $B_1$ does not have a corresponding reference image since there is no preceding image in this case. For the current embodiment the routine 1003 produces a total of 6 reference images, labelled as $B_2^{ref}$ to $B_7^{ref}$.

Of course, the reference image may be produced in any other suitable manner. For example, the reference image could comprise an image formed from a plurality of rotated CCD base image using any number of statistics from mean of, maximum of pixel values etc.

The next step is the normalisation to produce the incoherent change detection image. This embodiment produces the change detection image by creating a ratio, and so therefore uses the term "ratio image" to describe the change detection image. The ratio image is generated by the image ratio generation routine 1004 that forms a ratio between the reference and the corresponding image given as $$R_i = B_i^{ref} / B_i \text{ where } i=2 \text{ to } 7 \quad (3)$$

Here $R_i$ is the label referring to the ratio image for the i-th sequence image. The ratio image routine 1004 is applied on a total of 6 images starting from sequence number 2 and finishing with image sequence number 7.

The generation of the ratio image (or more generally the incoherent change detection image) using the reference image is the mechanism by which the change detection for the moving trail of the ground target is realised.

Following normalisation in the ratio image routine 1004, the subsequent routines 1005 to 1006 in the system 1000 of FIG. 6 describe a method for automatic detection of the moving targets using the ratio images. Such automatic detection adds to the convenience of use of the invention.

For this embodiment, the next step following the creation of the ratio images $R_i$ is to rotate them back into the original image co-ordinate axis. This is performed using the image rotation routine 1005. As in routine 1002, the squint angle in the file header determines the amount by which the image is rotated. The difference with routine 1005 is that the rotation is performed in the opposite direction. Thus for example if the squint angle is 10 degrees then the rotation angle will be −10 degrees. The routine processes a total of 6 ratio images and the output files are labelled $D_i$ where i=2 to 7.

The pre-screening routine 1006 then processes each of the $D_i$ files and generates a list of plot detections. The pre-screening consists of three sub-routines, initial detection (1106) (e.g. CFAR processing), clustering (1206) and discrimination (1306).

The initial detection routine 1106 performs a bright anomaly detection. This applies a CFAR adaptive thresholding to the image $D_i$ to flag up pixels that are anomalously bright compared to the local background. The CFAR detection technique is familiar to those skilled in the art of radar engineering. Thus for example a CFAR algorithm for a K-distribution background is described by reference [14]. For optimum results the CFAR algorithm has to take into account the correct statistics for the background of the ratio images.

For each image $D_i$ the initial detection routine 1106 outputs a corresponding binary image of the same size. The binary images, labelled $E_i$, where i=2 to 7, comprise of pixels of values zeros and ones where a one denotes a detection and a zero denotes no detection.

Clustering routine 1206 searches through the binary image $E_i$ and groups neighbouring pixels with values one into unique clusters. The clustering routine 1206 is known, and more details of generic clustering algorithms of the type used by routine 1206 can be found in Reference [15]. For each cluster that is identified in the binary image $E_i$, the clustering routine outputs a list that contains a unique identification (ID) number for the cluster, the number of pixels in the cluster and the row and column indices of the pixels identified as belonging to that cluster. Thus for example routine 1206 could output a list of the form

| 1 | 3 | 100,25; | 100,26; | 100,27 |
| --- | --- | --- | --- | --- |

This output list states that routine 1206 has found just one cluster which has been assigned the unique ID number "1". The total number of pixels in this cluster is three. The next three pair of numbers are the row and column indices of the three pixels belonging to cluster "1". The routine 1206 produces a cluster list file of this format corresponding to each binary image file $E_i$. These cluster list files are ASCII text files and are labelled $L_i$. There is one line of data per unique cluster. A total of 6 $L_i$ files are produced where i=2 to 7.

Once the pixels are clustered, a discrimination routine 1306 is used to reject false alarms. It is designed to reject clusters that are not valid targets. For a ground target such as a vehicle trail a valid cluster is likely to have a thin narrow profile, but this could differ if, for example, the vehicle does not move very far during successive SAR image frames in a given imaging pass. Other factors, such as complex manoeuvres of the target in between SAR image frames could also cause more complex vehicle trails to exist. The discrimination routine 1306 uses the binary image $E_i$ along with the corresponding cluster list file $L_i$ to calculate the discriminating features associated with each cluster. Criteria are specified for valid target features.

If vehicle shadow CCD changes are being detected a different set of discriminant features will be specified. They are related to the likely extent of target shadows taking into account both the target's dimensions and the imaging geometry. Thus routine 1306 is able to select clusters either on the basis of the vehicle ground trail or their shadow footprint.

If shadow CCD changes are being detected then the generation of the reference images may differ from those generated when detecting vehicle trails. As the shadows move with the targets they will appear at different places in the sequence of CDD images. To provide a better chance of detection when comparing an incoherent change detection image with a reference image, it is advantageous to temporally filter the images used to produce the reference image to reduce the influence of previous shadow images on the reference image. A shadow appearing in the incoherent change detection image will then stand out more clearly against the reference image. Such temporal filtering in producing the reference image is less important when detecting ground trails, as one is not trying to reduce the effect of previous ground trail detections.

For each binary image $E_i$, the routine 1306 reads the corresponding cluster list file $L_i$. For each cluster listed in $L_i$, (one per line), routine 1306 extracts a rectangular window from the image $E_i$. The size and location of the extraction window in image $E_i$ is set such that it includes all the pixels identified as belonging to a specific cluster.

However, since the cluster pixels are going to be spread somewhat randomly, a rectangle shape sub-image is likely to contain a number of zero-value pixels.

Figure 7:
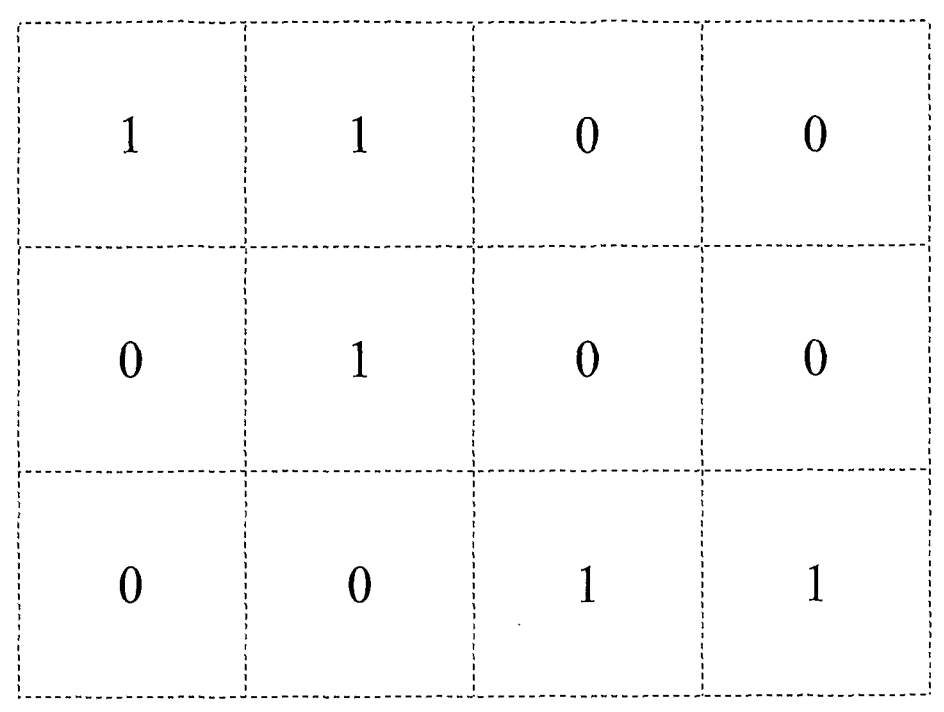

This is explained further with the aid of FIG. 7 which illustrates a 4 by 3 sub-image for a hypothetical five pixel cluster. As can be seen from FIG. 7 there are seven zero-value pixels in this sub-image. The binary sub-images corresponding to each cluster are used to estimate the cluster length, width and orientation using spatial moments. The spatial moment based estimation method is familiar to those skilled in the art of radar engineering and Reference [16] provides a suitable reference on this subject. From the length and width estimates, the cluster area and aspect ratio values can then be calculated.

The discrimination process of routine 1306 involves reading the cluster list L. For each cluster listed in $L_i$, a rectangle sub-image from the corresponding binary image file $E_i$ is extracted and a number of spatial features are estimated and compared to a predetermined acceptance criteria. There will be one set of criteria associated with vehicle ground trail and a separate set of criteria for vehicle shadow. A more advanced acceptance criteria could combine both set of acceptance criteria within a single scheme but should make allowances that changes which meet each subset of criteria i.e. ground trail only or shadow only are accepted along with those that meet the full criteria.

The acceptance criteria for ground trail changes may comprise a high correlation with relatively thin lines commensurate with linear movement of a target, and may also comprise high correlations with more complex shapes determined by potential movements of suspected target vehicles. Clusters for which any one of the feature values fall outside the acceptance range are reject as false alarms.

Similarly, the acceptance criteria for target shadow based CCD changes will depend upon the expected shape of target shadow footprint as determined by the length, width, area etc of the shadow region. Again clusters for which any one of the feature values fall outside the acceptance range are rejected as false alarms.

Details for accepted clusters are saved into a pre-screening detection file. This pre-screening detection file is an ASCII text file and is labelled P. The information that is recorded for each accepted cluster is the image index number "i", the squint angle corresponding to image i and the cluster centre pixel position as a row and column index number. Thus the file entry for each accepted cluster will be as follows

| i | squint_angle | cluster_centre_row_no | cluster_centre_column_no |
| --- | --- | --- | --- |

The discrimination routine 1306 processes each pair of $L_i$ and $D_i$ data files and store the output in file P using the format shown above. The process is repeated for all 6 pairs of data files and the results from each stored in the file P.

The data file P contains the results for the pre-screening as a result of processing all the available images. It contains the complete lists of all the vehicle trails detected over the full set of images. The location for each detection refers to the centre point of the trail. The next step is for the data transformation routine 1007 to transform the data of file P into a format appropriate for the tracker routine 1008.

Each line in the file P refers to a separate detection. Entries with identical image index number relate to detections reported for the same image. The routine 1007 reads each line and transforms the co-ordinate axis to align with the platform along-track and across track axis.

This ensures that detections across all the images are indexed using a common frame-of-reference. This rotation is done because the pre-screening steps of Initial Detection 1106, Clustering 1206 and Discrimination 1306 as described above were, in this particular embodiment, designed to work on images in their original orientation, whereas the following stage, the particular implementation of tracking routine 1008, requires in this embodiment the outputs from the pre-screening step 1006 to be suitably aligned.

The target row and column positions along with the image index number are recorded to a modified pre-screening file labelled as Q. The file Q is also an ASCII text file that contains one line entry per detection. Each entry is of the form

| i | target_row_no | target_column_no |
| --- | --- | --- | where the first entry refers to the image index number and the next two entries the position of the target.

Routine 1007 process each target entry in file P and outputs the results to file Q. The file Q has the same number of entries as file P. The data in file Q is in the format that can be passed to the tracker routine 1008.

The tracker routine 1008 applies a standard x-y Kalman filter to the data from file Q. This technique is familiar to those skilled in the art of tracking algorithms. A good reference on Kalman filter trackers is provided by Reference [17].

The output from routine 1008 is stored in a tracker output file that is labelled T. This is also an ASCII text file. It contains a list of targets that have produced valid tracks. Each entry recorded as a separate line in file T specifies the image index number, a unique track identifier and the target estimated row position, row velocity (m/s), column position and column velocity (m/s). The tracker can report a number of tracks for a given image. These will have the same image index number but different track ID numbers. A valid track is declared only if the target is detected in three or more consecutive images. The entries belonging to a specific track will have the same track id number but incrementing image index numbers. For example an entry in the file T may have the following values

| 6 | 3 | 145 | 5.6 | 55 | 1.2 |
|---|---|-----|-----|-----|-----|

This entry means that in image 6, the target belonging to the unique track id 3 is reported at row position 145 with a velocity along the row direction of 5.6 m/s. Its column position is 55 with a velocity along the column axis of 1.2 m/s. The generation of the tracking result file T completes the CCD moving target detection system 1000.

Of course, it will be clear to the normally skilled person that the pre-screening and subsequent tracking of the ratio images may be performed using any suitable algorithm, and the invention is not limited to those methods described herein.

Target motion parameters estimates obtained with method 1000 can then be used to refocus the original SAR image $SS_i$ to recover an image of the target. The focusing procedure would be similar to that describes in reference [18] but instead of performing an exhaustive search over all possible combinations of target motion only the parameters obtained from method 1000 are applied. This will therefore result in a large saving in processing time and effort over the exhaustive search.

The actual re-focusing process for a particular target will involve translating the target velocities specified in terms of along-track velocity (parallel to platform direction of travel) and cross-track velocity (perpendicular to platform direction of travel) into equivalent phase correction over the SAR synthetic aperture length. The mapping is such that the cross-track velocity component equated to a linear phase shift over the SAR synthetic aperture and the along-track velocity component equates to a quadratic phase shift over the SAR synthetic aperture. Target accelerations in along and cross-track direction produce higher order phase corrections. Yet higher order motion components produce even higher order phase corrections across the SAR aperture. However, to a first approximation only the target velocity components are taken into account in the phase correction term along with cross-track acceleration. A single expression is produced that combines the phase correction for all the motion components being considered. This phase correction term is transformed into the frequency domain. The SAR base image (of the type $SS_i$) is transformed in frequency along the azimuth dimension (rows). The frequency domain image is multiplied by the frequency correction term and the resultant is inverse frequency transformed along the azimuth dimension (row) to obtain a corrected SAR image in the original spatial domain. The target image in the adjusted SAR image is now correctly focused. The focusing process is repeated for each SAR base image $SS_i$. The whole re-focusing procedure for all aligned SAR base images is repeated for each detected target.

The target RCS or target size can be estimated from the focused SAR image and if this falls below a certain level then this can provide a mechanism for highlighting those targets that have a particularly low RCS value. Direct confirmation of the RCS of low signature targets is particularly difficult since traditional GMTI and SAR detection method will fail to detect the low RCS targets in the first instance.

Since the CCD based approach for detecting moving targets is not reliant upon the moving target direct radar echo, the detection performance is essentially independent of the target RCS. Focused images of the target can provide estimates of the target size either directly from the target image or from the shadows of the target given known imaging geometries. Alternatively, a rough estimate of the target size can be ascertained from the target axle length which can be obtained by measuring the distance between pairs of lines formed in the CCD images from tyres that are at either end of the axel of a vehicle. A ratio can be formed of the target RCS against target size. The ability to generate this ratio criterion will be entirely independent of the target actual RCS value.

Furthermore, the focused sequence of images for a given detected target can then be deployed in any of the available multi-frame recognition schemes such as active contour delineation as detailed in reference [19] and [20] to classify the target. The classification scheme can utilise the focused image of the target or the shadow image or both for the purpose of recognition.

The skilled person will be aware that other embodiments within the scope of the invention may be envisaged, and thus the invention should not be limited to the embodiments as herein described. For example, instead of the change detection of system 100 that performs uses pre-screening and tracking process the vehicle trail can be detected using template match lines, feature extract lines, segmentation and similar techniques.

Furthermore, the method is not limited to the detection of just moving vehicles. The CCD base image sequence can be utilised to observe and detect any dynamic event that is producing a temporal change in the scene. Provided that the change is observed via the incoherent change detection applied to the CCD base image sequence, the location and the translation motion parameters of the dynamic event can be estimated through the method described herein.

References

[1] D G Corr and A Rodrigues, "Coherent change detection of vehicle movements", *Proc. IGARSS* 1998, vol 5, 1998, pp. 2451-2453

[2] M Jahangir, "Moving target detection for Synthetic Aperture Radar via shadow detection", IET Radar 2007 Conf., 16-18 Oct. 2007, Edinburgh, UK

[3] H A Zebker, "Studying the earth with interferometric radar", IEEE *Computing in Science and Engineering*, vol 2, no. 3, pp. 52-60, 2000

[4] Z Yang and M Soumekh, "Adaptive along-track multi-channel SAR interferometry for moving target detection and tracking", IEEE Int. Radar Conf. 2005, 9-12 May 2005, pp. 337-342

[5] R Klemm, "Principles of space-time adaptive processing", 2"d ed., IEE *Radar, Sonar Navigation and Avionic Series* 12, 2002

[6] S Scarborough, C Lemanski, H Nichols, G Owirka, M Mirandi and T Hale, "SAR Change Detection MTI", *Proc. SPIE Algorithms for Synthetic Aperture Radar Imagery XIII*, vol 6237, 62370V, 2006

[7] M Jahangir, "System and Method for Processing Synthetic Aperture Imagery", UK Patent Application No. 0606489.3, 31 Mar. 2006

[8] F M Dickey and A W Doerry, "Recovering shape from shadows in synthetic aperture radar imagery", *Proc. SPIE Radar Sensor Technology XII*, vol. 6947, 694707, 2008

[9] M Jahangir, D Coe, A P Blake, P G kealey and C P Moate, "PodSAR: A versatile real-time SAR GMTI surveillance and targeting system", *IEEE RadarCon* 2008, 26-30 May 2008, Rome, Italy

[10] D Corr and A Rodrigues, "Coherent Change Detection", *Journal of Defence Science*, vol. 8, no. 1/2, May 2003, pp. 51-59

[11] W G Carrara, R S Goodman and R M Majewski, "Spotlight Synthetic Aperture Signal Processing Algorithms" Boston, Artech House, 1995

[12] C Y Chang, M Jin, and J C Curlander, "Squint Mode SAR Processing Algorithms", Proc. IEEE *International Geoscience and Remote Sensing Symposium IGARSS* 1989, pp: 1702-1706, July 1989

[13] E Hall, "Computer Image Processing and Recognition", Academic Press 1979, pp. 480-484

[14] G Blucher, D Blacknell, N J Redding and D Vagg, "Prescreening algorithm assessment within the analysts' detection support system", *Proc. International Radar Conf.* 2003, Adelaide, Australia, September 2003, pp 454-459

[15] M R Anderberg, "Cluster Analysis for Applications", Academic Press, 1973

[16] M R Teague, "Image analysis via the general theory of moments", *J. of Optical Society of America*, vol. 70, No. 8, 1979, pp. 920-930

[17] E Brooker, "Tracking and Kalman Filtering Made Easy", Wiley Interscience, 1998

[18] M J Minardi, L A Gorham and E G Zelnio, "Ground Moving Target Detection and Tracking based on Generalized SAR processing and Change Detection", *Proc. SPIE Algorithms for Synthetic Aperture Radar Imagery XII*, vol. 5808, 2005, pp. 156-165

[19] R D Hill, C P Moate and D Blacknell, "Urban scene analysis from SAR image sequences", *Proc. SPIE Algorithms for Synthetic Aperture Radar Imagery XII*, vol. 6237, 2006, pp. 623702-1-12

[20] M Jahangir, D Blacknell, C P Moate and R D Hill, "Extracting information from shadows in SAR imagery", *Inter. Conf. on Machine Vision ICMV* 2007, 2007, pp. 107-112

The invention claimed is:

1. A method of detecting movement parameters of a ground based target by processing first and a second temporal sequences of returns from a Synthetic Aperture system, each sequence collected during separate imaging passes, the returns comprising a plurality of synthetic aperture base images of a region comprising the steps of:
   i) pairing an image in the second temporal sequence with a corresponding primary image from the first temporal sequence, aligning the images if required and forming a coherent change detection (CCD) image, and repeating for each pair to produce a plurality of CCD base images;
   ii) forming a reference image from one or more of the CCD base images;
   iii) forming an "incoherent change detection" (ICD) image by normalising the reference image with a suitably aligned, predetermined CCD base image from the sequence;
   iv) analyzing the ICD image to detect a track left by the ground based target; and
   v) detecting the ground based target by producing one or more focused images by manipulating phases of the temporal returns according to motion parameters estimated from the track of the ground based target.

2. A method as claimed in claim 1 wherein the returns are from a synthetic aperture radar system.

3. A method as claimed in claim 1 wherein steps ii) and iii) are repeated for successive CCD base images, to form a sequence of incoherent change detection images.

4. A method as claimed in claim 3 wherein the sequence of incoherent change detection images is provided as an input to an automatic target detection algorithm.

5. A method as claimed in claim 1 wherein the reference image is formed by temporally filtering two or more of the CCD base images.

6. A method as claimed in claim 1 wherein the reference image comprises one of the CCD images.

7. A method as claimed in claim 1 wherein the incoherent change detection image comprises a ratio of two CCD base images.

8. A method as claimed in claim 1 wherein one or more incoherent change detection images are analysed to detect the shadow of the target in the imagery.

9. A method as claimed in claim 8 wherein a radar cross section (RCS) value of the detected target is estimated from its focused image.

10. A processing system for the detection of movement parameters of a target, the processing system processing returns from a Synthetic Aperture system, comprising a processor adapted to receive data from the synthetic aperture system, the data comprising image information from two independent imaging passes of the same scene, the image information comprising a plurality of synthetic aperture images from each pass of the scene, the processing system comprising a processor adapted to process the data in the form of synthetic aperture images from the two independent imaging passes and, pairing primary and repeat pass images for the same geometries, to produce a coherent change detection (CCD) image for each pairing, so generating a plurality of CCD base images;
   wherein;
   the processor is adapted to form a reference image from one or more of the CCD base images, the one or more CCD base images being suitably spatially aligned with respect to each other; and
   the processor is further adapted to normalise the reference image with a given CCD base image to form an associated incoherent change detection image, the given CCD base image being suitably aligned with the reference image;
   the processor being further adapted to analyze one or more incoherent change detection images to detect a track left by the target on the ground, and to locate the target by producing one or more focused images by manipulating phases of the temporal returns according to motion parameters estimated from the track of the target.

11. A processing system as claimed in claim 10 wherein the system forms part of a synthetic aperture radar system.

12. A processing system as claimed in claim 10 wherein the system is adapted to process data previously generated by a synthetic aperture system.

13. A processing system as claimed in claim 10 wherein the processor is adapted to produce a plurality of incoherent change detection images from a succession of CCD base images.

14. A processing system as claimed in claim 13 wherein the processor is adapted to process the plurality of incoherent change detection images to automatically detect moving targets in the scene.

15. A processing system as claimed in claim 10 wherein the reference image comprises one of the CCD images.

16. A processing system as claimed in claim 10 wherein the processor is adapted to form the reference image(s) by temporally filtering two or more of the CCD base images.

17. A processing system as claimed in claim 10 wherein the processor is adapted to form the incoherent change image(s) by calculating a ratio of two CCD base images.

18. A processing system as claimed in 10 wherein the processing system is adapted to obtained focused images based upon a shadow of a moving target.

19. A non-transitory computer readable storage medium configured to store a computer program, the computer program being adapted to implement the method as claimed in claim 1 on a computer system, and further adapted, when run on the computer system, to produce image data comprising an incoherent change detection image.

* * * * *